United States Patent
Chan

(10) Patent No.: US 11,840,796 B2
(45) Date of Patent: Dec. 12, 2023

(54) LAUNDRY BASKET SYSTEM

(71) Applicant: Tina Kim Chan, Altadena, CA (US)

(72) Inventor: Tina Kim Chan, Altadena, CA (US)

(*) Notice: Subject to any disclaimer, the term of this patent is extended or adjusted under 35 U.S.C. 154(b) by 150 days.

(21) Appl. No.: 17/694,191

(22) Filed: Mar. 14, 2022

(65) Prior Publication Data
US 2023/0287623 A1  Sep. 14, 2023

(51) Int. Cl.
*D06F 95/00* (2006.01)
*B62B 3/00* (2006.01)
*B62B 3/02* (2006.01)

(52) U.S. Cl.
CPC ........... *D06F 95/002* (2013.01); *B62B 3/004* (2013.01); *B62B 3/02* (2013.01); *B62B 2202/66* (2013.01)

(58) Field of Classification Search
CPC ......... D06F 95/002; B62B 3/004; B62B 3/02; B62B 2202/66
USPC .................................. 206/278, 205; 280/659
See application file for complete search history.

(56) References Cited

U.S. PATENT DOCUMENTS

| | | | | |
|---|---|---|---|---|
| 2,517,757 A | * | 8/1950 | Adlerstein | A45F 3/04 383/41 |
| 2,636,800 A | * | 4/1953 | William | A47B 61/00 312/351 |
| D229,663 S | * | 12/1973 | Morita | D34/19 |
| 4,248,442 A | * | 2/1981 | Barrett | B62B 5/06 206/505 |
| 5,119,173 A | | 6/1992 | Proctor et al. | |
| 5,678,717 A | | 10/1997 | Hsu et al. | |
| 5,690,217 A | | 11/1997 | Friday | |
| 5,833,336 A | | 11/1998 | Dean | |
| 6,357,567 B1 | * | 3/2002 | Tsai | A45C 5/14 190/103 |
| D462,149 S | | 8/2002 | Hall | |
| 6,659,273 B1 | * | 12/2003 | Scola | A45C 15/00 206/285 |
| D491,327 S | | 6/2004 | Gambino | |
| D532,568 S | * | 11/2006 | Rodriguez | D32/37 |
| 7,204,407 B2 | | 4/2007 | Laher | |
| D739,988 S | * | 9/2015 | Buckner | D32/37 |
| 10,647,340 B2 | * | 5/2020 | Kinnee | B62B 5/0079 |
| 2050/0051981 | | 3/2005 | Wallace | |
| 2005/0145458 A1 | * | 7/2005 | Cohen | A47B 61/06 190/110 |

(Continued)

*Primary Examiner* — John K Fristoe, Jr.
*Assistant Examiner* — Justin Caudill
(74) *Attorney, Agent, or Firm* — Eric Karich; Karich + Associates

(57) ABSTRACT

A laundry basket system has a laundry housing with a base that extends to a base perimeter, and an upwardly extending wall that extends upwardly from the base perimeter of the base to form a laundry receiving chamber. The upwardly extending wall extends to a top perimeter that forms an upper opening. An access opening in the upwardly extending wall allows access into the laundry receiving chamber. A plurality of pallets each have a generally planar body that extends to an outer perimeter, the outer perimeter being sized and shaped to slidably abut the inner surface of the upwardly extending wall, so that the plurality of pallets may be slidably inserted through the upper opening of the upwardly extending wall, in a horizontal configuration, and into the laundry receiving chamber. A hanger assembly may also be mounted on the laundry housing.

14 Claims, 4 Drawing Sheets

(56) References Cited

U.S. PATENT DOCUMENTS

| | | | |
|---|---|---|---|
| 2005/0207682 A1* | 9/2005 | Stager | A45C 13/04 |
| | | | 383/117 |
| 2006/0022419 A1 | 2/2006 | Phillips | |
| 2007/0020471 A1 | 8/2007 | Boone | |
| 2007/0256994 A1* | 11/2007 | Jackson | A45C 9/00 |
| | | | 211/195 |
| 2008/0277906 A1* | 11/2008 | Dunne | B62B 3/02 |
| | | | 280/659 |
| 2010/0072718 A1* | 3/2010 | Funk | B62B 3/003 |
| | | | 280/47.371 |
| 2015/0108739 A1* | 4/2015 | Kassab Arabo | B62B 3/00 |
| | | | 280/651 |

* cited by examiner

LAUNDRY BASKET SYSTEM

BACKGROUND OF THE INVENTION

Field of the Invention

This invention relates generally to laundry baskets, and more particularly to a laundry basket system that functions for the collection of soiled laundry, and also as an organizer and caddy for the return of clothes once they have been laundered.

DESCRIPTION OF RELATED ART

The prior art includes a wide range of laundry baskets that are generally in the form of a bag, hamper, or cabinet. Cabinet style laundry baskets typically include a door for accessing the interior of the laundry basket for reaching multiple storage bags hanging vertically within the cabinet, so that the bags may be removed to take the clothes to the laundry machine. Each bag may receive different types of laundry (e.g., whites, darks, etc.).

Laher, U.S. Pat. No. 7,204,407, is an example of such as laundry cabinet. The cabinet includes a carrying frame with several cutouts, each receiving a bag-like receptacle that hangs vertically from the frame. The cabinet has a front door which allows access to the bag-like receptacles. See also Boone, U.S. 2007/0200471, and Hall, U.S. D462,149.

Wallace, U.S. 2005/0051981, teaches a laundry caddy that includes a box having a bottom wall with a front wall and a pair of opposed side walls and being secured to, and extending upwardly therefrom. The box also includes a top wall that is hingedly secured to one of the opposed side walls and a back wall and that is hingedly secured to one of the opposed side walls. The top wall and the back wall are each capable of moving between a closed condition wherein access to the interior of the box is not easily obtained and an open condition wherein access to the interior of the box is easily obtained. A pair of wheels is secured to the bottom wall of the box. A handle is secured to the box and extends upwardly therefrom. A pair of latches is secured to the box for selectively retaining the top wall and the back wall in a closed condition.

The prior art teaches laundry baskets that are generally in the form of a cabinet, and include a door for accessing the interior of the laundry basket. The prior art also teaches vertically hanging baskets. However, the prior art does not teach a laundry basket system that includes an interior that receives a plurality of pallets that are vertically disposed for holding organized and folded laundry in a stack. The prior art also does not teach a folding hanger assembly mounted on the laundry basket. The present invention fulfills these needs and provides further advantages as described in the following summary.

SUMMARY OF THE INVENTION

The present invention teaches certain benefits in construction and use which give rise to the objectives described below.

The present invention provides a laundry basket system for collecting soiled clothes, and for use as a caddy for the return of the clothes once they have been laundered. The laundry basket system comprises a laundry housing having a base that extends to a base perimeter, and an upwardly extending wall that extends upwardly from the base perimeter of the base to form a laundry receiving chamber, the upwardly extending wall having an outer surface and an inner surface. The upwardly extending wall extends upwardly to a top perimeter that forms an upper opening, which allows laundry to be dropped into the laundry receiving chamber while the access door is closed. An access opening in the upwardly extending wall allows access into the laundry receiving chamber. An access door is pivotally mounted on the upwardly extending wall adjacent the access opening for movement between a closed position wherein the access door substantially closes the access opening, and an open position wherein the access door does not substantially impede access through the access opening. A plurality of pallets each have a generally planar body that extends to an outer perimeter, the outer perimeter being sized and shaped to slidably abut the inner surface of the upwardly extending wall, so that the plurality of pallets may be slidably inserted through the upper opening of the upwardly extending wall and into the laundry receiving chamber.

In one embodiment, the system may further include a hanger assembly mounted on the laundry housing, the hanger assembly having a pair of longitudinal struts each connected at a proximal end via a pivot to the laundry housing, and connected at a distal end via a crossbar. The hanger assembly pivots on the pivots between a lowered position wherein the crossbar is positioned adjacent to the upwardly extending wall beneath the access opening, and a raised position wherein the pair of longitudinal struts are generally vertical, and the crossbar may be used for hanging the clothing.

A primary objective of the present invention is to provide a laundry basket system having advantages not taught by the prior art.

Another objective is to provide a laundry basket system that includes a plurality of pallets that may be slidably inserted, in a horizontal orientation, through the upper opening of the upwardly extending wall and into the laundry receiving chamber, for separating the clothes into different groups.

A further objective is to provide a laundry basket system that includes a hanger assembly that pivots between raised and lowered positions.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, a laundry basket system that functions for the collection of soiled laundry, and also as an organizer and caddy for the return of clothes once they have been laundered.

Figure 1:
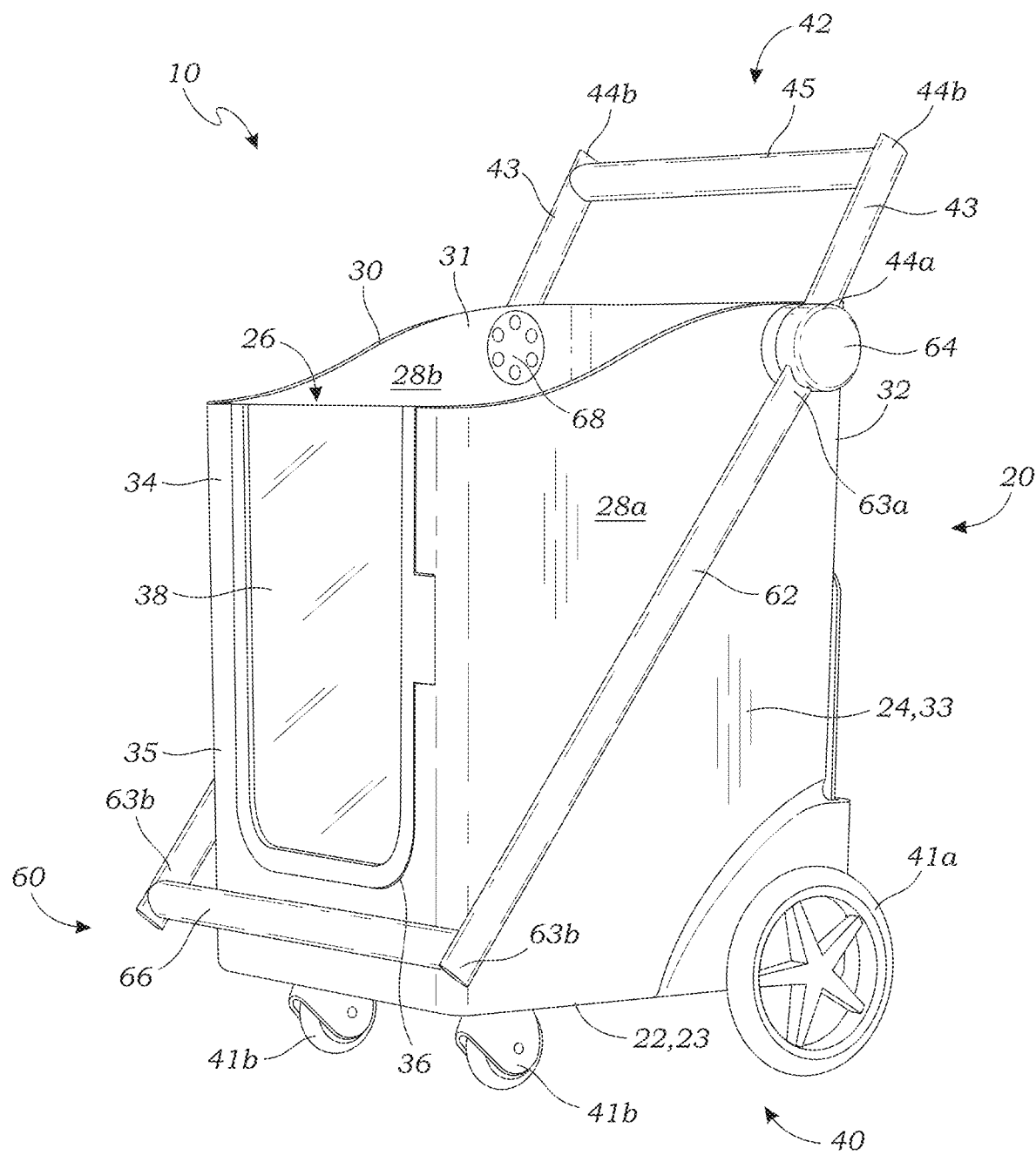
FIG. 1 is a front perspective view of a laundry basket system according to one embodiment of the present invention, illustrating a front access door in a closed position, and a hanger assembly in a lowered position.

FIG. 1 is a front perspective view of a laundry basket system 10 according to one embodiment of the present invention, illustrating a front access door 38 in a closed position, and a hanger assembly 60 in a lowered position, each discussed below. As shown in FIG. 1, in this embodiment, the laundry basket system 10 comprises a laundry housing 20 having a base 22 that extends to a base perimeter 23, and an upwardly extending wall 24 that extends upwardly from the base perimeter 23 of the base 22 to form a laundry receiving chamber 26. The upwardly extending wall 24 includes an outer surface 28a and an inner surface 28b, and further extends upwardly to a top perimeter 30 to form an upper opening 31. The upper opening 31 allows laundry (not shown) to be dropped into the laundry receiving chamber 26 while the access door 38 is closed.

Figure 3:
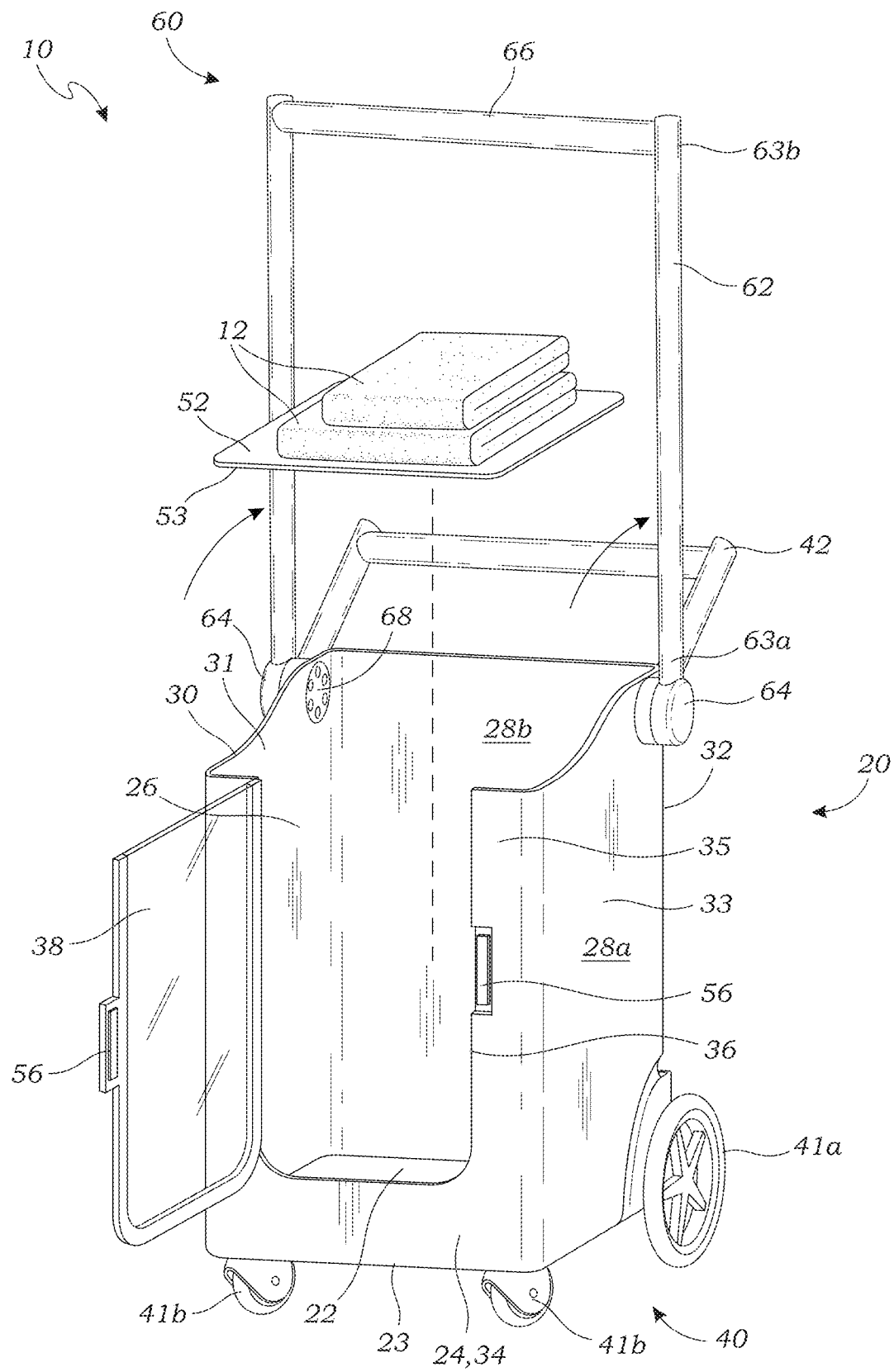
FIG. 3 is an exploded front perspective view of the laundry basket system of FIG. 1, illustrating the front access door in an open position for receiving pallets of laundry, and a hanger assembly in a raised position.
Figure 4:
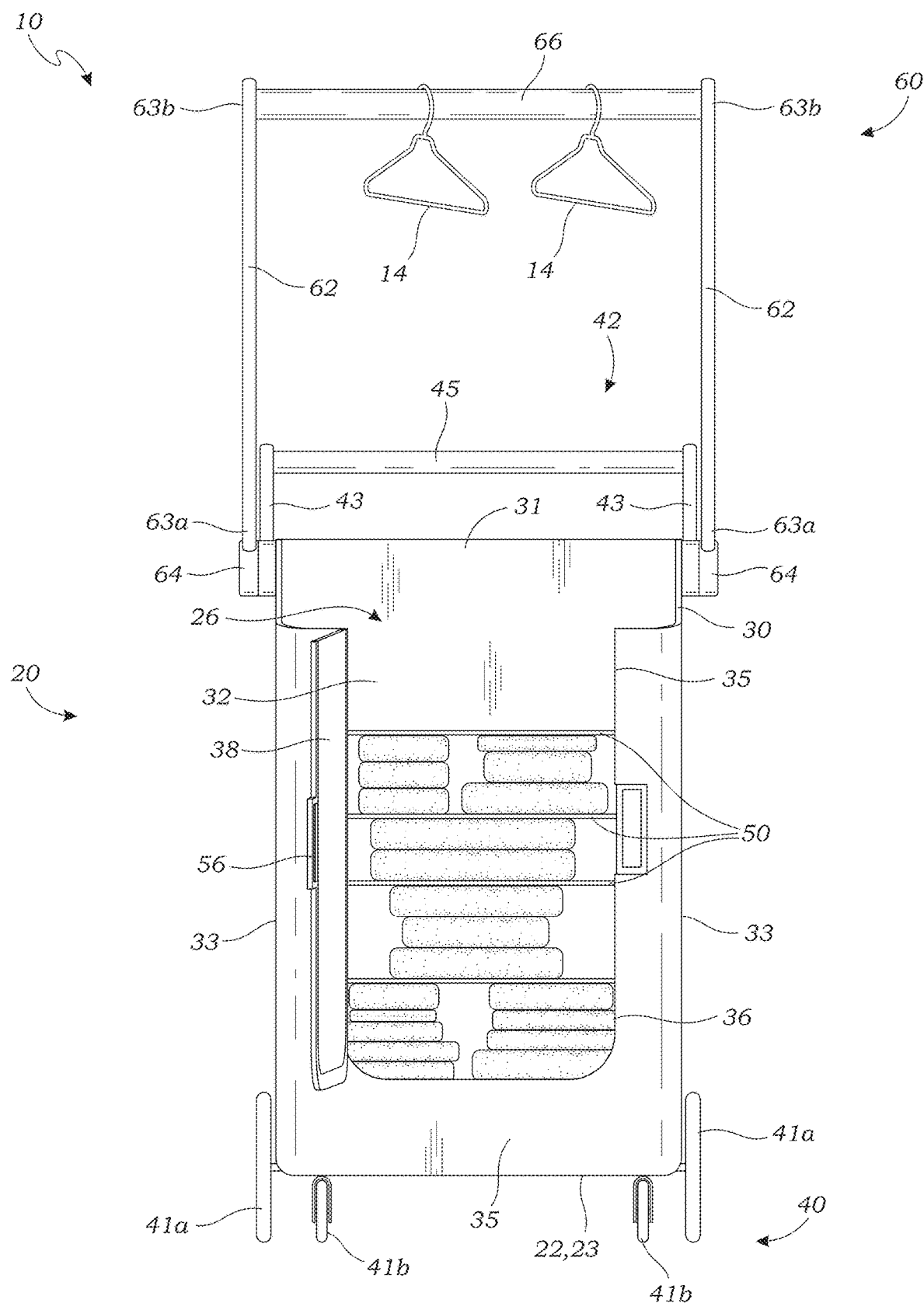
FIG. 4 is a front elevation view thereof.

In this embodiment, the laundry housing 20 is generally rectangular, and the upwardly extending wall 24 includes a rear panel 32, side panels 33, and a front panel 34. However, in alternative embodiments, the upwardly extending wall 24 may be tubular, or include a greater or fewer number of panels than the illustrated embodiment. As illustrated in FIG. 1, an access opening 36 in the upwardly extending wall 24 allows for access into the laundry receiving chamber 26, so that it may be accessed via both the upper opening 31 and the access opening 36. In this embodiment, the front panel 34 of the upwardly extending wall 24 forms a frame 35 around the access opening 36, though the access opening 36 may alternatively be formed in a different panel/section of the upwardly extending wall 24. The access door 38 is pivotally mounted on the upwardly extending wall 24 adjacent the access opening 36 for movement between a closed position wherein the access door 38 substantially closes the access opening 36 (FIG. 1), and an open position wherein the access door 38 does not substantially impede access through the access opening 36 (FIGS. 3-4). As shown, the access door 38 may be at least partially constructed of a transparent material (e.g., plastic, glass, etc.) for viewing the contents of the laundry receiving chamber 26 while the access door 38 is in the closed position.

In some embodiments, the laundry housing 20 further comprises a plurality of wheels 40 for supporting the base 22 for rolling movement. In this embodiment, the plurality of wheels 40 is in the form of a pair of rear fixed wheels 41a and a pair of front caster wheels 41b, but in other embodiments a different number or type(s) of wheels may be used. Additionally, the laundry housing 20 may include a handle portion 42 for maneuvering the laundry housing 20 on the plurality of wheels 40. In some embodiments, the handle portion 42 comprises a pair of longitudinal supports 43 each connected at a first end 44a to the laundry housing 20 adjacent the upper opening 31, and connected at a second end 44b via a horizontal rod 45 for gripping. The first ends 44a of the longitudinal supports 43 may be pivotally attached to the laundry housing 20, or fixedly attached, and may further be attached to any other suitable portion of the laundry housing 20. While one example of the handle portion 42 is illustrated and discussed herein, it should be understood that other types of handles may be included within the scope of the claims of the present invention, having a wide range of potential features. For example, the handle portion 42 may include a T-shaped handle, straps, knobs, etc., and may comprise features such as a grip portion, an adjustment mechanism, etc., or any other features known to those skilled in the art.

Figure 2:
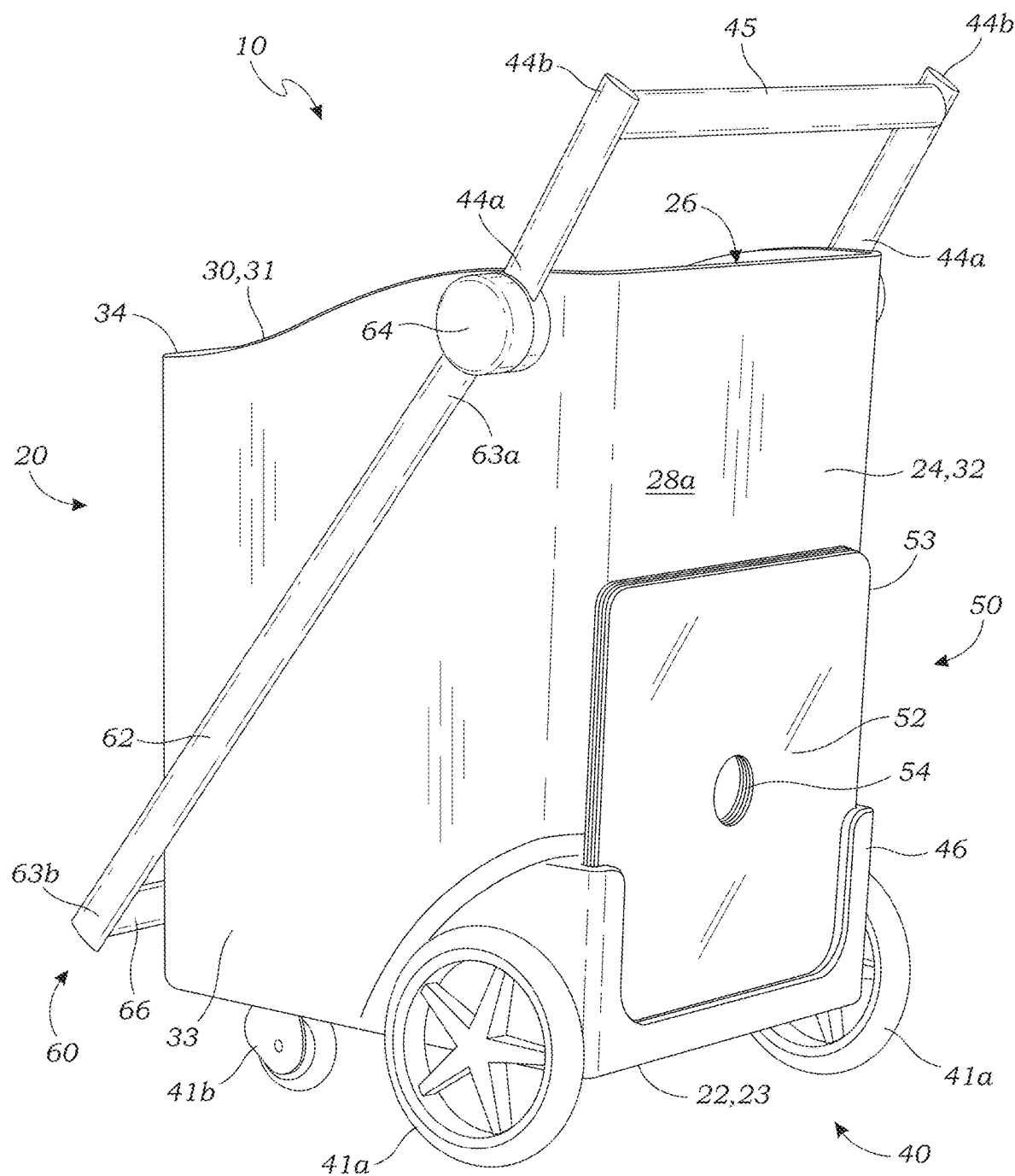
FIG. 2 is a rear perspective view of the laundry basket system of FIG. 1.

FIG. 2 is a rear perspective view of the laundry basket system 10 of FIG. 1. As shown in FIG. 2, in this embodiment, the laundry housing 20 further comprises a pallet retaining structure 46 on the upwardly extending wall 24, the pallet retaining structure 46 being sized and adapted to retain a plurality of pallets 50. In this embodiment, the pallet retaining structure is formed on the outer surface 28a of the rear panel 32 of the upwardly extending wall 24, but it may be formed/mounted anywhere on the laundry housing 20, or excluded from the product. Each of the plurality of pallets 50 has a generally planar body 52 that extends to an outer perimeter 53, wherein the outer perimeter 53 is sized and shaped to slidably abut the inner surface 28b of the upwardly extending wall 24, best shown in the following Figures and discussed in greater detail below. As shown in FIG. 2, in this embodiment, the plurality of pallets 50 is shaped to compliment the generally rectangular laundry housing 20. However, in alternative embodiments, the pallets 50 may compliment any shape of the laundry housing 20 (e.g., rounded, many-sided, irregular, etc.). Furthermore, in this embodiment, each of the pallets 50 includes a central aperture 54 for ease of handling. Alternatively, the pallets 50 may each be handled via a different means, e.g., irregular edges, a loop strap, notches, etc.

FIG. 3 is an exploded front perspective view of the laundry basket system 10 of FIG. 1, illustrating the front access door 38 in an open position for accessing the laundry receiving chamber 26, and the hanger assembly 60 in a raised position. FIG. 4 is a front elevation view thereof, showing the pallets of laundry within the laundry receiving chamber 26. As shown in FIGS. 3-4, the access door 38 may be pivoted from the closed position to the open position to expose the access opening 36. As illustrated, in this embodiment, the access door 38 is hingeably attached to the frame 35 of the laundry housing 20, but in other embodiments may be attached via another means, e.g., a slidable door/cover, a removable fastener, etc. The access door 38 of this embodiment further has a fastener 56 in the form of a pair of magnetic strips attached to both the access door 38 and the frame 35, but in other iterations a different type of fastener may be used, e.g., latch/clip, strap, buckle, hook-and-loop fastener, etc., or any other suitable form of fastener known in the art.

In use, the access door 38 is opened to allow access into the laundry receiving chamber 26, either for removing laundry to be washed, or for organizing laundry after it has been washed. As illustrated, folded clothing 12 or similar may be placed on one of the plurality of pallets 50 of FIG. 2 so that it may then be slidably inserted through the upper opening 31 of the upwardly extending wall 24 and into the laundry receiving chamber 26. The plurality of pallets 50 are adapted to be slidably inserted, in a horizontal orientation, through the upper opening 31 of the upwardly extending wall 24 and into the laundry receiving chamber 26, for separating the clothes 12 into different groups when they are stacked within the laundry receiving chamber 26. For example, different types of clothes may be grouped together, or clothes for different members of a family. This facilitates distribution of the clothes once they have been taken to bedrooms or other storage areas. This process may be repeated until each of the plurality of pallets 50 having the folded laundry 12 thereupon is stacked within the laundry receiving chamber 26 (FIG. 4).

As shown in FIGS. 3-4, the hanger assembly 60 is also mounted on the laundry housing 20 on a pivot so that it can be raised to a raised position for hanging hangars 14 for holding some of the clothes 12. In this embodiment, the hanger assembly 60 comprises a pair of longitudinal struts 62 each connected at a proximal end 63*a* via a pivot 64 to the laundry housing 20, and connected at a distal end 63*b* via a crossbar 66. The hanger assembly 60 pivots on the pivots 64 between a lowered position wherein the crossbar 66 is positioned adjacent to the upwardly extending wall 24 beneath the access opening 36 (FIGS. 1-2), and a raised position wherein the pair of longitudinal struts 62 may be generally vertical (or at least in a raised position suitable for hanging clothes), and the crossbar 66 may be used for hanging the clothing 12 (FIGS. 3-4), either on hangers 14 or directly on the crossbar 66. In some embodiments, the pivots 64 may include a locking mechanism 68 for securing the hanger assembly 60 in the desired position, which may be any form of locking mechanism (e.g., a resistance gear, pin lock, elastics, etc.). While one embodiments of the hanger assembly 60 is shown and described, many variations and additional features may be implemented, e.g., an adjustment mechanism, grip portion, notches for hangers, etc., according to the needs of the manufacturer and consumer.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A laundry basket system for collecting soiled clothes, and for use as a caddy for the return of the clothes once they have been laundered, the laundry basket system comprising:
    a laundry housing having a base that extends to a base perimeter, and an upwardly extending wall that extends upwardly from the base perimeter of the base to form a laundry receiving chamber, the upwardly extending wall having an outer surface and an inner surface;
    wherein the upwardly extending wall extends upwardly to a top perimeter that forms an upper opening;
    an access opening in the upwardly extending wall that allows access into the laundry receiving chamber;
    an access door pivotally mounted on the upwardly extending wall adjacent the access opening for movement between a closed position wherein the access door substantially closes the access opening, and an open position wherein the access door does not substantially impede access through the access opening; and
    a plurality of pallets that each have a generally planar body that extends to an outer perimeter, the outer perimeter being sized and shaped to slidably abut the inner surface of the upwardly extending wall, so that the plurality of pallets are adapted to be slidably inserted, in a horizontal orientation, through the upper opening of the upwardly extending wall and into the laundry receiving chamber, for separating the clothes into different groups when they are stacked within the laundry receiving chamber.

2. The laundry basket system of claim 1, wherein the laundry housing is generally rectangular, and the upwardly extending wall includes a rear panel, side panels, and a front panel, and wherein the front panel includes the access opening, and forms a frame around the access opening, with the access door being pivotally mounted on the frame.

3. The laundry basket system of claim 1, further comprising a hanger assembly mounted on the laundry housing, the hanger assembly having a pair of longitudinal struts each connected at a proximal end via a pivot to the laundry housing, and connected at a distal end via a crossbar, the hanger assembly pivoting on the pivots between a lowered position wherein the crossbar is positioned adjacent to the upwardly extending wall beneath the access opening, and a raised position wherein the pair of longitudinal struts are generally vertical, and the crossbar may be used for hanging the clothing.

4. The laundry basket system of claim 3, further including a handle portion mounted to the laundry housing for maneuvering the laundry housing on the plurality of wheels.

5. The laundry basket system of claim 1, wherein the access door is at least partially constructed of a transparent material for viewing the contents of the laundry receiving chamber while the access door is in the closed position.

6. The laundry basket system of claim 1, further comprises a pallet retaining structure on the outer surface of the upwardly extending wall, the pallet retaining structure being sized and adapted to retain the plurality of pallets.

7. The laundry basket system of claim 1, wherein the pivots of the hanger assembly include a locking mechanism for securing the hanger assembly in the lowered or raised positions.

8. A laundry basket system for collecting soiled clothes, and for use as a caddy for the return of the clothes once they have been laundered, the laundry basket system comprising:
    a laundry housing having a base that extends to a base perimeter, and an upwardly extending wall that extends upwardly from the base perimeter of the base to form a laundry receiving chamber, the upwardly extending wall having an outer surface and an inner surface;
    wherein the upwardly extending wall extends upwardly to a top perimeter that forms an upper opening;
    an access opening in the upwardly extending wall that allows access into the laundry receiving chamber;
    an access door pivotally mounted on the upwardly extending wall adjacent the access opening for movement between a closed position wherein the access door substantially closes the access opening, and an open position wherein the access door does not substantially impede access through the access opening;
    a plurality of pallets that each have a generally planar body that extends to an outer perimeter, the outer perimeter being sized and shaped to slidably abut the inner surface of the upwardly extending wall, so that the plurality of pallets may be slidably inserted through the upper opening of the upwardly extending wall and into the laundry receiving chamber; and
    a hanger assembly mounted on the laundry housing, the hanger assembly having a pair of longitudinal struts each connected at a proximal end via a pivot to the laundry housing, and connected at a distal end via a crossbar, the hanger assembly pivoting on the pivots between a lowered position wherein the crossbar is positioned adjacent to the upwardly extending wall beneath the access opening, and a raised position wherein the pair of longitudinal struts are generally vertical, and the crossbar may be used for hanging the clothing.

9. The laundry basket system of claim 8, wherein the laundry housing is generally rectangular, and the upwardly extending wall includes a rear panel, side panels, and a front panel, and wherein the front panel includes the access opening, and forms a frame around the access opening, with the access door being pivotally mounted on the frame.

10. The laundry basket system of claim 8, further comprising a plurality of wheels for supporting the base of the laundry housing for rolling movement.

11. The laundry basket system of claim 10, further including a handle portion mounted to the laundry housing for maneuvering the laundry housing on the plurality of wheels.

12. The laundry basket system of claim 8, wherein the access door is at least partially constructed of a transparent material for viewing the contents of the laundry receiving chamber while the access door is in the closed position.

13. The laundry basket system of claim 8, further comprises a pallet retaining structure on the upwardly extending wall, the pallet retaining structure being sized and adapted to retain the plurality of pallets.

14. The laundry basket system of claim 8, wherein the pivots of the hanger assembly include a locking mechanism for securing the hanger assembly in the lowered or raised positions.

\* \* \* \* \*